(12) United States Patent
Wang et al.

(10) Patent No.: US 11,455,999 B1
(45) Date of Patent: Sep. 27, 2022

(54) DETECTION OF OFF-TOPIC SPOKEN RESPONSES USING MACHINE LEARNING

(71) Applicant: Educational Testing Service, Princeton, NJ (US)

(72) Inventors: Xinhao Wang, San Carlos, CA (US); Su-Youn Yoon, Tokyo (JP); Keelan Evanini, Pennington, NJ (US); Klaus Zechner, Princeton, NJ (US); Yao Qian, Dublin, CA (US)

(73) Assignee: Educational Testing Service, Princeton, NJ (US)

( * ) Notice: Subject to any disclaimer, the term of this patent is extended or adjusted under 35 U.S.C. 154(b) by 231 days.

(21) Appl. No.: 16/844,439

(22) Filed: Apr. 9, 2020

Related U.S. Application Data

(60) Provisional application No. 62/831,956, filed on Apr. 10, 2019.

(51) Int. Cl.
*G10L 15/26* (2006.01)
*G10L 15/16* (2006.01)
*G06N 3/08* (2006.01)

(52) U.S. Cl.
CPC .............. *G10L 15/26* (2013.01); *G06N 3/08* (2013.01); *G10L 15/16* (2013.01)

(58) Field of Classification Search
CPC ............ G10L 15/26; G10L 15/16; G06N 3/08
See application file for complete search history.

(56) References Cited

U.S. PATENT DOCUMENTS

| | | | |
|---|---|---|---|
| 2012/0323573 A1* | 12/2012 | Yoon | G09B 19/06 704/236 |
| 2015/0194147 A1* | 7/2015 | Yoon | G09B 19/06 704/236 |
| 2019/0050875 A1* | 2/2019 | McCord | G06Q 30/0201 |
| 2019/0057693 A1* | 2/2019 | Fry | G10L 15/22 |
| 2020/0227066 A1* | 7/2020 | Taub | G10L 25/72 |
| 2020/0311114 A1* | 10/2020 | Sood | G06F 16/345 |
| 2020/0320380 A1* | 10/2020 | Cmielowski | G06F 16/9024 |
| 2020/0320898 A1* | 10/2020 | Johnson | G10L 15/08 |
| 2021/0072219 A1* | 3/2021 | Nakaya | G06T 7/0012 |

OTHER PUBLICATIONS

ETS; The Official Guide to the TOEFL Test, Fourth Edition; McGraw-Hill: New York, NY; 2012.
(Continued)

*Primary Examiner* — Daniel C Washburn
*Assistant Examiner* — Athar N Pasha
(74) *Attorney, Agent, or Firm* — Jones Day

(57) ABSTRACT

Data is received that encapsulates a spoken response to a prompt text comprising a string of words. Thereafter, the received data is transcribed into a string of words. The string of words is then compared with a prompt so that a similarity grid representation of the comparison can be generated that characterizes a level of similarity between the string of words in the spoken response and the string of words in the prompt text. The grid representation is then scored using at least one machine learning model. The score indicates a likelihood of the spoken response having been off-topic. Data providing the encapsulated score can then be provided. Related apparatus, systems, techniques and articles are also described.

20 Claims, 6 Drawing Sheets

ON-TOPIC RESPONSES

OFF-TOPIC RESPONSES

(56) References Cited

OTHER PUBLICATIONS

Longman, Pearson; The Official Guide to Pearson Test of English Academic; Pearson Education ESL; 2010.
Cullen, Pauline, French, Amanda, Jakeman, Vanessa; The Official Cambridge Guide to IELTS; Cambridge University Press; 2014.
Lochbaum, Karen, Rosenstein, Mark, Foltz, Peter, Derr, Marcia; Detection of Gaming in Automated Scoring of Essays with the IEA; Paper presented at the National Council on Measurement in Education Conference (NCME); San Francisco, CA; Apr. 2013.
Higgins, Derrick, Heilman, Michael; Managing What We Can Measure: Quantifying the Susceptibility of Automated Scoring Systems to Gaming Behavior; Educational Measurement: Issues and Practice, 33(4); pp. 36-46; 2014.
Higgins, Derrick, Burstein, Jill, Attali, Yigal; Identifying Off-Topic Student Essays Without Topic-Specific Training Data; Natural Language Engineering, 12(2); pp. 145-159; 2006.
Louis, Annie, Higgings, Derrick; Off-topic Essay Detection Using Short Prompt Texts; Proceedings of the NAACL HLT 2010 Fifth Workshop on Innovative Use of NLP for Building Educational Applications; pp. 92-95; 2010.
Yoon, Su-Youn, Xie, Shasha; Similarity-Based Non-Scorable Response Detection for Automated Speech Scoring; Proceedings of the 9th Workshop on Innovative Use of NLP for Building Educational Applications; Baltimore, MD; pp. 116-123; Jun. 2014.
Cheng, Jian, Shen, Jianqiang; Off-Topic Detection in Automated Speech Assessment Applications; Proceedings of the 12th Annual Conference of the International Speech Communication Association; Florence, Italy; pp. 1597-1600; Aug. 2011.
Kusner, Matt, Sun, Yu, Kolkin, Nicholas, Weinberger, Killian; From Word Embeddings to Document Distances; Proceedings of the 32nd International Conference on Machine Learning, vol. 37 of Proceedings of Machine Learning Research; pp. 957-966; 2015.
Mueller, Jonas, Thyagarajan, Aditya; Siamese Recurrent Architectures for Learning Sentence Similarity; Proceedings of the 30th AAAI Conference on Artificial Intelligence; 2786-2792; 2016.
Rei, Marek, Cummins, Ronan; Sentence Similarity Measures for Fine-Grained Estimation of Topical Relevance in Learner Essays; Proceedings of the 11th Workshop on Innovative Use of NLP for Building Educational Applications; 2016.
Malinin, Andrey, Van Dalen, Rogier, Wang, Yu, Knill, Kate, Gales, Mark; Off-Topic Response Detection for Spontaneous Spoken English Assessment; Proceedings of the 54th Annual Meeting of the Association for Computational Linguistics; Berlin, Germany; pp. 1075-1084; Aug. 2016.
Yoon, Su-Youn, Lee, Chong Min, Choi, Ikkyu, Wang, Xinhao, Mulholland, Matthew, Evanini, Keelan; Off-Topic Spoken Response Detection with Word Embeddings; Proceedings of Interspeech; Stockholm, Sweden; pp. 2754-2758; Aug. 2017.
Conneau, Alexis, Schwenk, Holger, Le Cun, Yann, Barrault, Loic; Very Deep Convolutional Networks for Text Classification; Proceedings of the European Chapter of the Association for Computational Linguistics (EACL); 2017.
Mikolov, Tomas, Sutskever, Ilya, Chen, Kai, Corrado, Greg, Dean, Jeffrey; Distributed Representations of Words and Phrases and Their Compositionality; Advances in Neural Information Processing Systems; 2013.
Krizhevsky, Alex, Sutskever, Ilya, Hinton, Geoffrey; ImageNet Classification with Deep Convolutional Neural Networks; Proceedings of the Advances in Neural Information Processing Systems; pp. 1097-1105; 2012.
Simonyan, Karen, Zisserman, Andrew; Very Deep Convolutional Networks for Large-Scale Image Recognition; ICLR; 2015.
Szegedy, Christian, Liu, Wei, Jia, Yangqing, Sermanet, Pierre, Reed, Scott, Anguelov, Dragomir, Erhan, Dumitru, Vanhoucke, Vincent, Rabinovich, Andrew; Going Deeper with Convolutions; CVPR; 2015.
Ioffe, Sergey, Szegedy, Christian; Batch Normalization: Accelerating Deep Network Training by Reducing Internal Covariate Shift; ArXis; Feb. 2015.
Szegedy, Christian, Vanhoucke, Vincent, Ioffe, Sergey, Shlens, Jon, Wojna, Zbigniew; Rethinking the Inception Architecture for Computer Vision; CVPR; pp. 2818-2826; 2015.
Szegedy, Christian, Ioffe, Sergey, Vanhoucke, Vincent, Alemi, Alex; Inception-v4, Inception-ResNet and the Impact of Residual Connections on Learning; Proceedings of the 31st AAAI Conference on Artificial Intelligence; pp. 4278-4284; 2017.
Hu, Jie, Shen, Li, Sun, Gang; Squeeze-and-Excitation Networks; IEEE Conference on Computer Vision and Pattern Recognition; pp. 7132-7141; 2018.
Zhang, Chunlei, Koishida, Kazuhito, Hansen, John; Text-Independent Speaker Verification Based on Triplet Convolutional Neural Network Embeddings; IEEE/ACM Transactions on Audio, Speech, and Language Processing, 26 (9); pp. 1633-1644; Sep. 2018.
He, Kaiming, Zhang, Xiangyu, Ren, Shaoqing, Sun, Jian; Deep Residual Learning for Image Recognition; Proceedings of the IEEE Conference on Computer Vision and Pattern Recognition; pp. 770-778; 2016.
Tao, Jidong, Ghaffarzadegan, Shabnam, Chen, Lei, Zechner, Klaus; Exploring Deep Learning Architecture for Automatically Grading Non-Native Spontaneous Speech; Proceedings of IEEE ICASSP; pp. 6140-6144; 2016.
Rehurek, Radim, Sojka, Petr; Software Framework for Topic Modelling With Large Corpora; Proceedings of the LREC Workshop on New Challenges for NLP Framework; pp. 45-50; May 2010.
Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

* cited by examiner

ON-TOPIC RESPONSES    OFF-TOPIC RESPONSES

DETECTION OF OFF-TOPIC SPOKEN RESPONSES USING MACHINE LEARNING

RELATED APPLICATION

The current applications claims priority to U.S. Pat. App. Ser. No. 62/831,956 filed on Apr. 10, 2019 the content of which are hereby fully incorporated by reference.

TECHNICAL FIELD

The subject matter described herein relates to the automatic detection of off-topic spoken responses utilizing machine learning.

BACKGROUND

Test takers in high-stakes speaking assessments may try to inflate their scores by providing a response to a question that they are more familiar with instead of the question presented in the test; such a response is referred to as an off-topic spoken response. The presence of these responses can make it difficult for computer-implemented assessment engines to accurately evaluate a test taker's speaking proficiency, and thus may reduce the validity of assessment scores. Off-topic spoken responses are particularly difficult to identify by computer-implemented assessment engines when new test questions are launched and references samples are either not available or limited.

SUMMARY

In a first aspect, data is received that encapsulates a spoken response to a test question. Thereafter, the received data is transcribed into a string of words. The string of words is then compared with at least prompt (e.g., which can be conveyed in textual form or orally, etc.) so that a similarity grid representation of the comparison can be generated that characterizes a level of similarity between the string of words in the spoken response and the string of words in the text of the prompt. The grid representation is then scored using at least one machine learning model. The score indicates a likelihood of the spoken response having been off-topic. Data providing the encapsulated score can then be provided.

Providing, in this regard, can include one or more of displaying the score in an electronic visual display, loading data encapsulating the score in memory, storing the data encapsulating the score in physical persistence, or transmitting the data encapsulating the score to a remote computing device.

The transcribing can utilize an automated speech recognition (ASR) engine.

The at least one machine learning model can take various forms such as a deep learning model (e.g., a very deep convolutional neural network, etc.).

The similarity grid representation can be a similarity grid. The similarity grid can comprise a single channel in which each pixel indicates a cosine similarity of word embeddings between pairs of words from the string of words in the spoken response and the string of words in the prompt text. In some variations, the similarity grid comprises multiple channels in which different channels encode similarities from different aspects. A first channel can indicate a cosine similarity of word embeddings between pairs of words from the string of words in the spoken response and the string of words in the prompt text. A second channel can scale similarities with word importance values, i.e, inverse document frequency (idf), for the string of words in the spoken response. A third channel can scale similarities with the idf values for the string of words in the text of the prompt.

In another interrelated aspect, data is received that encapsulates a spoken response to a prompt. Thereafter, the received data is transcribed into a string of words. Function words are then removed from the string of words to result in only content words. These content words are then compared with content words in the prompt. A similarity grid representation of the comparison is then generated that characterizes a level of similarity between the content words in the response and the content words in the prompt. The grid is then scored using at least one deep learning machine learning model. This score indicates a likelihood of the spoken response having been off-topic. Data can then be provided that encapsulates the score.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides innovative techniques for detecting off-topic responses in the context of spoken language assessment. Text-to-text similarity comparison between two documents is visualized in a grid and then a machine learning model such as a very deep convolutional neural network is employed to detect instances of plagiarism. This approach outperforms conventional techniques that are based on text-to-text content similarity. In fact, this approach can be applied more generally for any task that relies on similarity measurements between two sequences. In addition, as represented in multiple-channel grids, the similarity measurement at each cell can be scaled in terms of word importance values. In fact, the number of channels is not limited, and a similarity grid can consist of as many channels as necessary to encode the similarities from different aspects.

Figure 1:
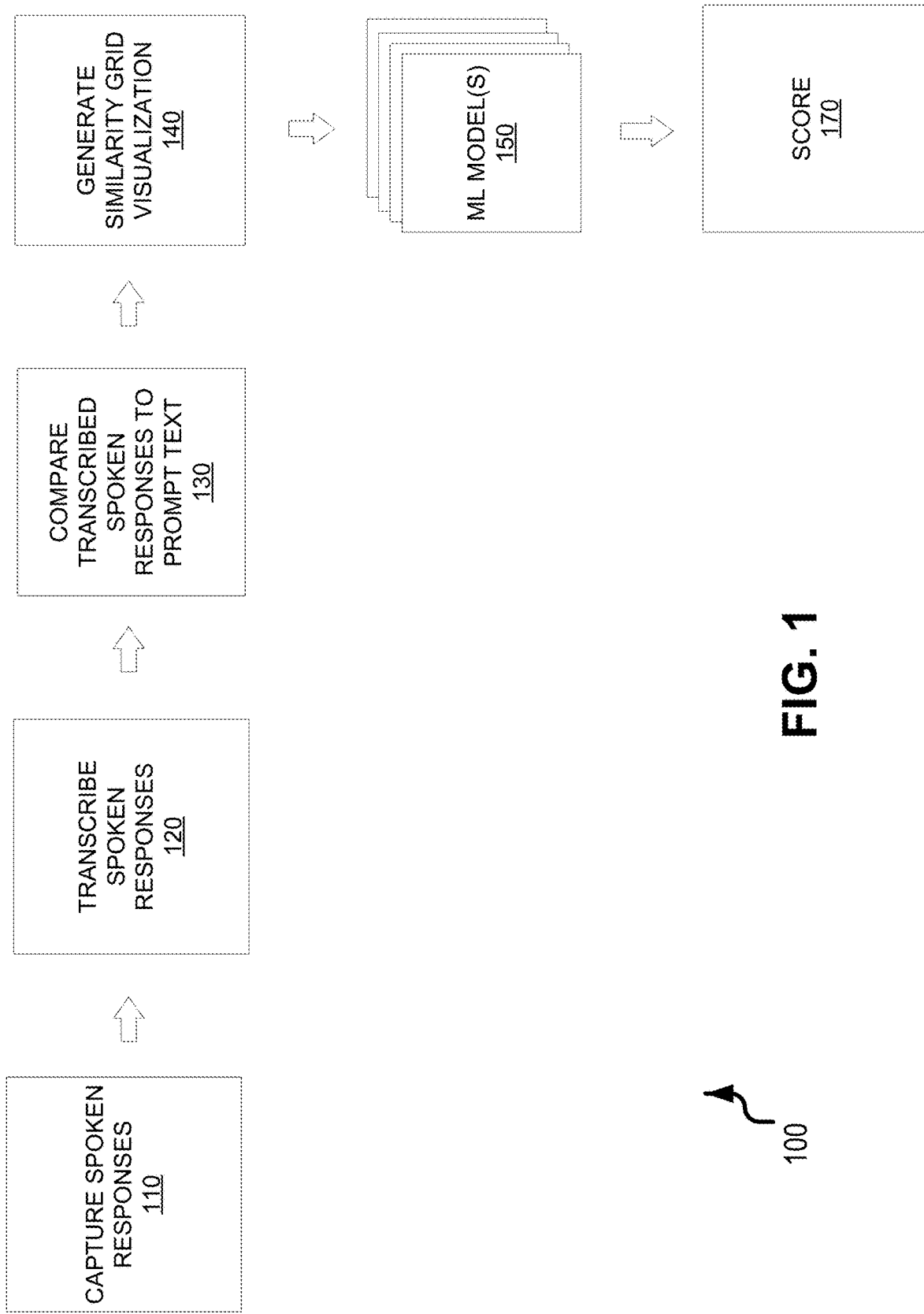
FIG. 1 is a diagram illustrating a workflow for detecting off-topic spoken responses using machine learning.

FIG. 1 is a diagram 100 illustrating a workflow providing enhanced techniques for detecting whether a spoken response is copied or otherwise derived from a prompt text (i.e., the text used to elicit the spoken response whether conveyed to a user in visual form or conveyed to a user orally). Initially, at 110, spoken responses to various test questions are captured (i.e., detected by a microphone, recorded, etc.). These spoken responses are transcribed, at 120, using automatic speech recognition (ASR) technique. Next, at 130, the transcribed spoken responses are compared to the corresponding prompt text. This comparison is then used to generate, at 140, a similarity grid visualization. This similarity grid is then input into one or more machine learning models 150 (e.g., a deep learning model) which are trained using historical data to generate a classification of the spoken response such as a score 170. The score 170 can be a binary classification (off-topic/on-topic) or it can be a numerical value over a range (e.g., probability between 0.0 and 1.0.)

Figure 2:
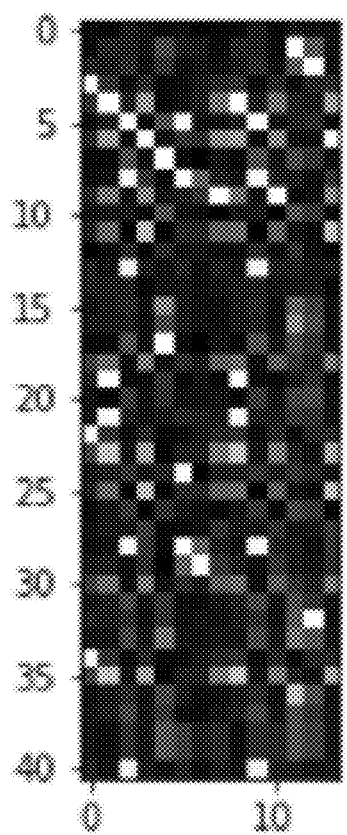
FIG. 2 is a diagram illustrating example similarity visualization for on-topic responses (left) and off-topic responses (right)
Figure 2:
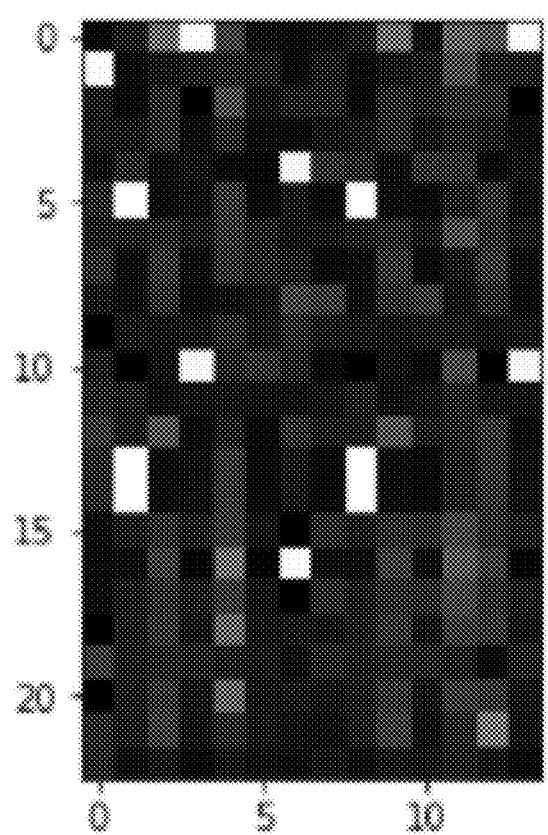

FIG. 2 is a diagram shows similarity grids (generated at 140) for two example responses to the same test question: the image on the left corresponds to an on-topic response and image on the right corresponds to an off-topic response. While constructing the similarity grids, all the function words can be removed from both the responses and corresponding prompts (so only content words remain). In particular, FIG. 2 illustrates a similarity grid for each pair of a response and the corresponding prompt, in which the content word sequence from the response is included on the y-axis from top to bottom, and the content word sequence from the prompt is included on the x-axis from left to right. Accordingly, a cell (i; j) in the grid indicates a similarity measurement between the ith content word in the response and the jth content word in the prompt. With this arrangement, semantic similarities of word pairs are calculated as the cosine similarity between word embeddings in which, as an example, a word2vec model trained on the Google News Corpus is used to extract embedding vectors.

The similarity grids have one channel, i.e., one single measurement value for each cell, and they can be visualized as grayscale images with lighter cells (pixel values closer to 255) indicating higher degrees of similarity and darker cells (pixel values closer to 0) indicating lower similarity.

Referring again to FIG. 2, the comparison between the two images indicates that more cells in the on-topic grid are lighter than in the off-topic one; accordingly, the task of off-topic detection can be characterized as filtering grids with more darkness and less brightness.

Furthermore, just as in composing an image, the similarity grid can be represented in grayscale with one channel (each pixel in the image is encoded with only one value) or with multiple channels, as in an RGB image with 3 channels (each pixel is encoded with three different values, one value corresponding to each channel). Therefore, additional channels can be used in the similarity grid to convey additional information comparing between the response and the prompt. For example, in addition to semantic similarity values, other metrics measuring word importance can be stored in other channels. Inverse document frequency, idf, weights can be used to indicate the importance of different words in a document in tasks such as text classification and information retrial. Here, based on idf values, 1-channel grids can be expanded to 3-channel ones. For example, for each cell (i; j) in a grid, the value in the first channel can still be the cosine similarity of word embeddings. The value in the second channel can be the idf weight of the ith content word in the response. Similarly, the value in the third channel can be the idf weight of the jth content word in the prompt. In this way, the similarity measurement at each cell can be scaled in terms of idf word importance values. In fact, the number of channels is not limited, and a similarity gird can comprise as many channels as necessary to encode the inputs from different aspects.

Due to the large variations in the lengths of spoken responses and prompt texts, the sizes of the similarity grids fluctuate substantially. In order to meet the constraint of fixed-length input for models such as the Inception networks, an image resizing method based on bilinear interpolation can applied to scale all similarity grids into a standard size of 180 (the maximum length of a spoken response) by 180 (the maximum length of a prompt).

Figure 3:
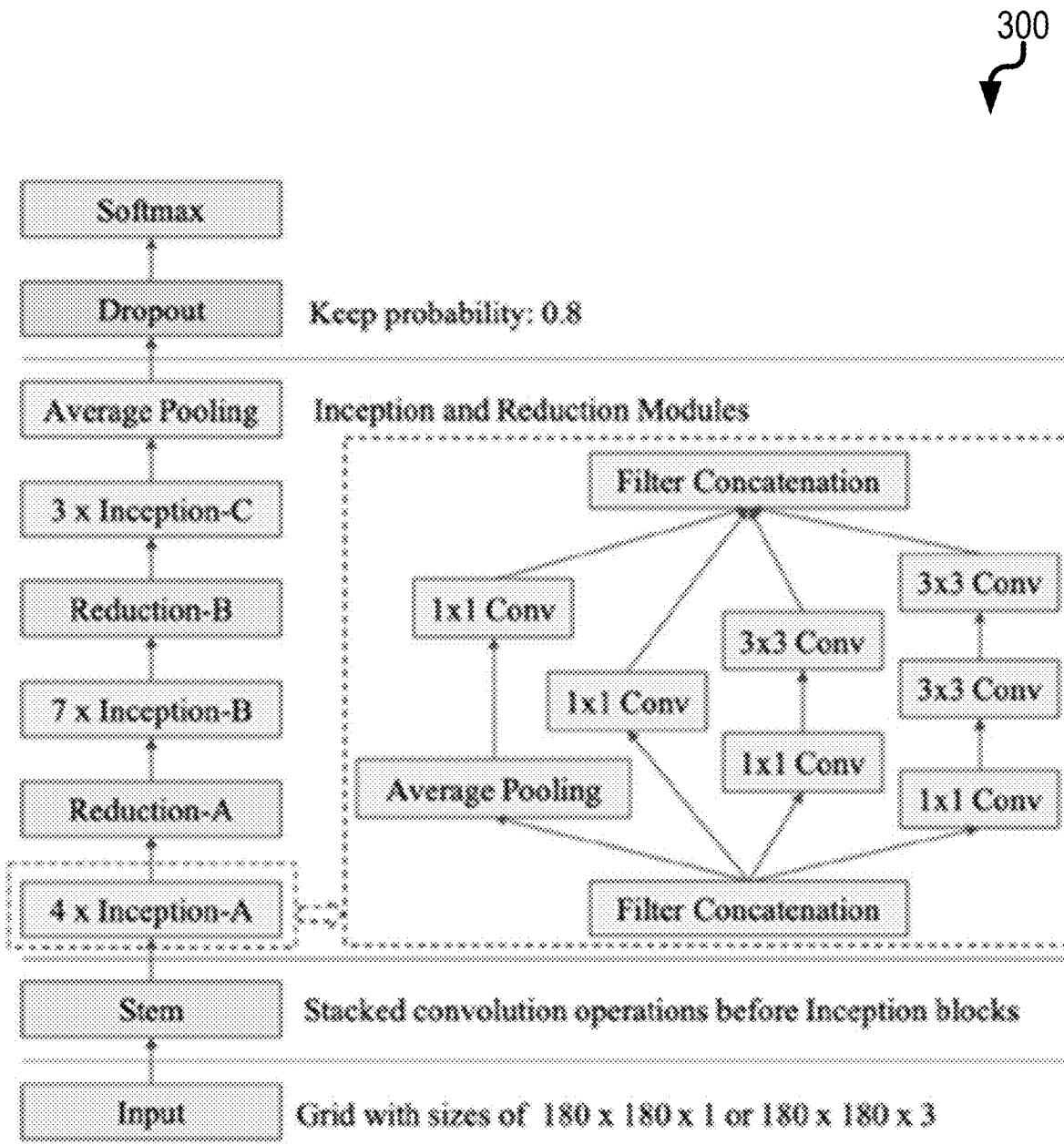
FIG. 3 is a diagram illustrating a sample machine learning model that can be used with some variations of the current subject matter.
Figure 4:
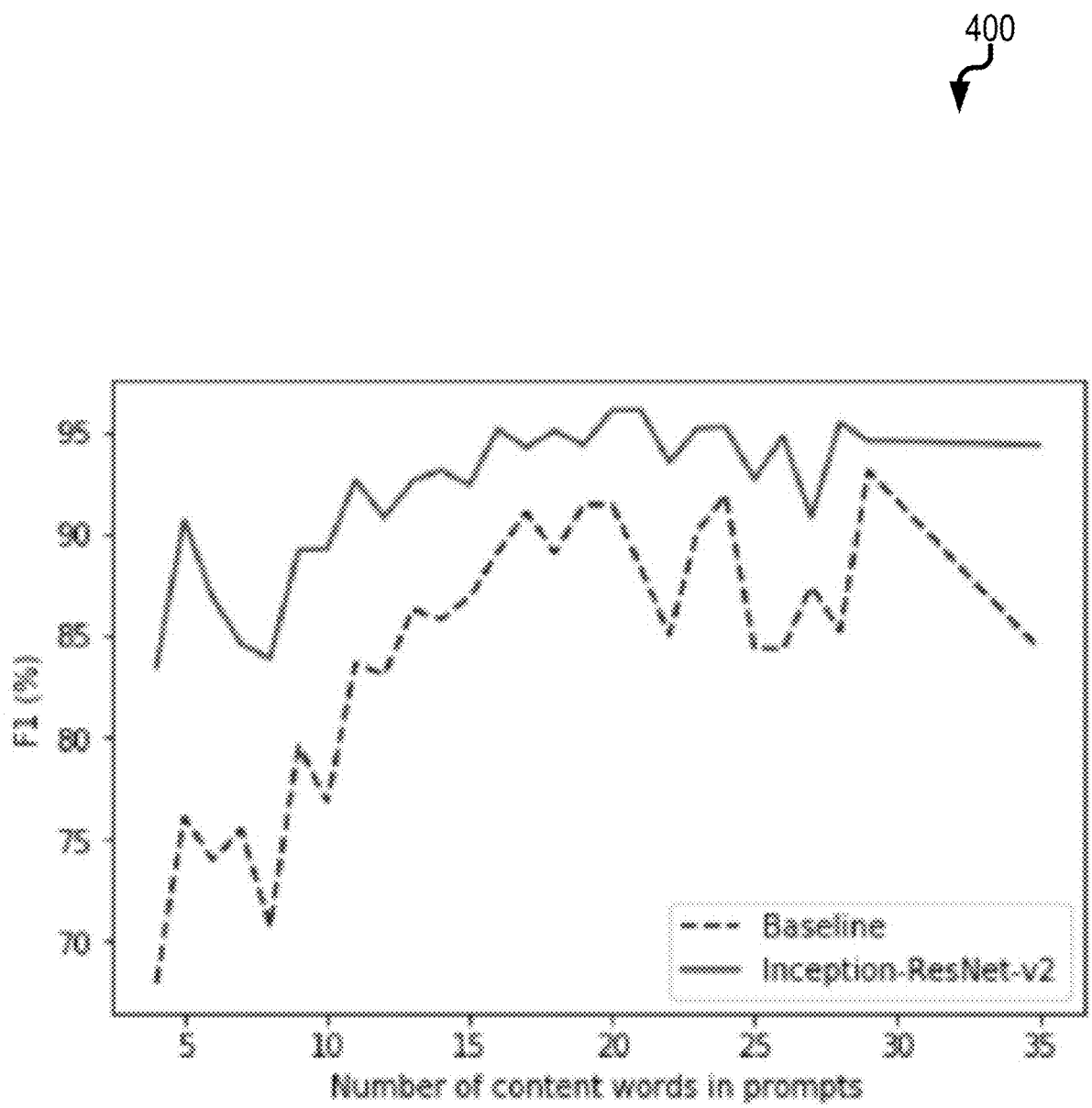
FIG. 4 is a diagram illustrating F1-scores compared to the length of prompt texts.

In some variations, an Inception network can be the utilized ML model 150. It will be appreciated that other types of machine learning models can be also be utilized and that an Inception network is described solely as an illustrative example. An inception network consists of a highly hand-crafted architecture. FIG. 3 is a diagram 300 illustrating an example Inception network, the Inception-v4. "Stem" is an initial set of stacked convolution/max-pooling operations performed before applying Inception blocks, and it can vary across different versions of Inception networks. In Inception-v4, there are three main modules as well as one reduction block. FIG. 3 shows an example of the Inception-A module.

The main characteristics of the Inception modules are as follows. First, in a CNN, the kernel size of the convolution operation relates to the range of distributed information that is captured by filters, i.e., the larger more globally and the smaller more locally. Due to the wide variation of the information location, the choice of the right kernel size is important and difficult. In order to deal with this problem, Inception modules are built to have multiple different sizes of filters in parallel at the same level. Thus, the Inception network is also wider in addition to being deeper. Second, very deep neural networks always face the challenge of expensive computation. Inception networks first reduce the dimension of input channels by adding an extra 1×1 convolution before the larger convolutions. In addition, they also use factorization to break down convolutions with larger sizes into smaller ones, for example, factorizing a 5×5 convolution into two consecutive 3×3 ones; factorizing a n×n convolution into two consecutive ones with sizes of 1×n and n×1 respectively. Third, residual connections can be introduced in Inception-ResNet, which, in turn, can speed up the training process of very deep networks.

As part of the experimental studies, three versions of Inception networks for the plagiarism detection task were used: Inception-v3, Inception-v4, and Inception-ResNet-v2. Compared with Inception-v3, Inception-v4 has a more uniform simplified architecture and more Inception modules. Meanwhile, it was found that Inception-ResNet-v2 added residual connections into the Inception architecture, which was empirically shown to accelerate the training of Inception networks significantly. The TensorFlow source code was used to develop models.

The current innovations were informed by various experimentation with a focus in the context of a large-scale, high-stakes English language assessment for non-native speakers that assesses communication skills for academic purposes. The speaking section of this assessment contains six tasks designed to elicit spontaneous spoken responses: two of them require test takers to provide an opinion based on personal experience, which are referred to as independent tasks; and The other four tasks require test takers to summarize or discuss material provided in a reading and/or listening passage; these are referred to as integrated tasks. In general, the independent tasks ask questions on topics that are familiar to test takers and are not based on any stimulus materials. A sample independent question is "Talk about an activity you enjoyed doing with your family when you were a kid". Therefore, test takers can provide responses containing a wide variety of specific examples, and most instances of off-topic responses were found in response to these independent questions.

A study was conducted in which a large number of spoken responses from operational administrations of the assessment were collected. All of them were elicited using independent questions and each response contained approximately 45 seconds of spontaneous speech from non-native speakers of English. A total of 283 questions covering a wide range of topics such as education, entertainment, health, and policies were used in this study. The prompt texts presented to test takers in these questions were relatively short and typically consisted of just a few sentences. Table 1 shows that the number of words in each prompt text ranges from 9 to 60. After removing stop words, the shortest prompt text includes only 4 content words.

TABLE 1

|  | min | max | mean | std |
| --- | --- | --- | --- | --- |
| number of words | 9 | 60 | 31.2 | 10.0 |
| number of content words | 4 | 35 | 15.7 | 5.4 |

183,111 spoken responses were collected in reply to the 283 questions described above and further partitioned them into two sets: 120,115 in the Training set and 62,996 responses in the Test set. There was no speaker overlap between the two partitions.

All responses used in the study were originally scored by expert human raters during the operational test, and off-topic responses are rare in such a scoring scenario. As it is not very practical to collect a large amount of authentic off-topic responses from actual administrations of the test, a set of synthetic off-topic responses were created for the following experiments.

Each question in the assessment was designed to elicit content that was substantially different from others, and therefore, mismatched responses have substantial content issues, i.e. a response to one question is not topically related to another question.

Furthermore, experts (assessment developers) suggested that test takers could recite pre-memorized responses (for different questions) regardless of which question they were given.

According to this assumption, within each test question, a subset was randomly selected from responses elicited with the other 282 questions and took them as off-topic responses for this give question. Among each partition, the same number of off-topic responses were selected according to the number of on-topic responses, resulting in a ratio of 1:1 between on-topic and off-topic responses.

A Kaldi-based automatic speech recognition (ASR) engine, which had a word error rate (WER) of around 23% on a held-out test set with 600 responses, was employed to transcribe the non-native speech into text. The ASR system consisted of a gender-independent acoustic model and a trigram language model, which were trained with a data set including similar responses (around 800 hours of speech) drawn from the same assessment.

As part of the study, it was demonstrated that similarity features based on word embeddings can outperform a Siamese CNN, and, as such, a baseline system was built with the following three different types of features:

Word Mover's Distance (WMD): This feature calculates the sum of the minimum distances between words in the two compared documents (a spoken response and a prompt text) where the distance between two words was the Euclidean distance between the two corresponding word vectors in the embedding space.

Averaged word embeddings: Given an input document, a representative vector can be generated by mapping each word to its embedding vector and then averaging all word vectors. Then the cosine similarity between two vectors representing a spoken response and a prompt text can be calculated.

idf-weighted word embeddings: When generating the representative vector for an input document, idf weights can be used to scale each word embedding; then, the weighted embeddings can be averaged and the cosine similarity between a spoken response and a prompt text can be calculated.

These features measured the semantic similarity between a response and a test question in an embedding space, where the word2vec model used in constructing similarity grids as provided above was also used to extract word embeddings, and the genism package was used to calculate the WMD.

Finally, the baseline system was built with a Random Forest classifier using the scikit-learn machine learning toolkit.

The techniques described herein that are based on similarity grids and Inception networks was compared with the baseline system. As shown in Table 2, the baseline system obtained the lowest F1-score of 85.5%. When constructing the similarity grids without idf values, Inception-v4 can achieve the best F1-score at 89.1%. Furthermore, by appending idf channels into grids, the F1-scores can be consistently improved across all three Inception networks, and Inception-Resnet-v2 achieves the best F1-score at 92.8%, substantially outperforming the baseline system. With idf weights to indicate word importance in the similarity grid, the precision of Inception-Resnet-v2 was markedly increased from 85.6% to 91.5%, along with a 3.1% improvement on the recall. The addition of residual connections into Inception-Resnet-v2 can speed up the training process by making it converge with fewer epochs.

TABLE 2

| | Precision (%) | Recall (%) | F1 (%) |
|---|---|---|---|
| Similarity Grid without idf | | | |
| Inception-v3 | 84.7 | 92.2 | 88.3 |
| Inception-v4 | 86.5 | 91.8 | 89.1 |
| Inception-Resnet-v2 | 85.6 | 91.1 | 88.3 |
| Similarity Grid with idf | | | |
| Inception-v3 | 90.2 | 94.1 | 92.1 |
| Inception-v4 | 90.9 | 93.4 | 92.1 |
| Inception-Resnet-v2 | 91.5 | 94.2 | 92.8 |
| Baseline | 81.4 | 90.0 | 85.5 |

Furthermore, the F1-scores were broken down according to the lengths of prompt texts (number of content words included in the test questions). As shown in diagram 300 of FIG. 3, despite certain fluctuations, automatic systems tend to perform better on questions with more content words, and Inception-Resnet-v2 consistently outperforms the baseline across all prompts. In particular, with only very limited numbers of content words in the prompts, for example, less than 10, the Inception network can achieve larger gains. Meanwhile, with the longest test question (including 35 content words), the improvement with Inception-Resnet-v2 is also comparably larger.

Figure 5:
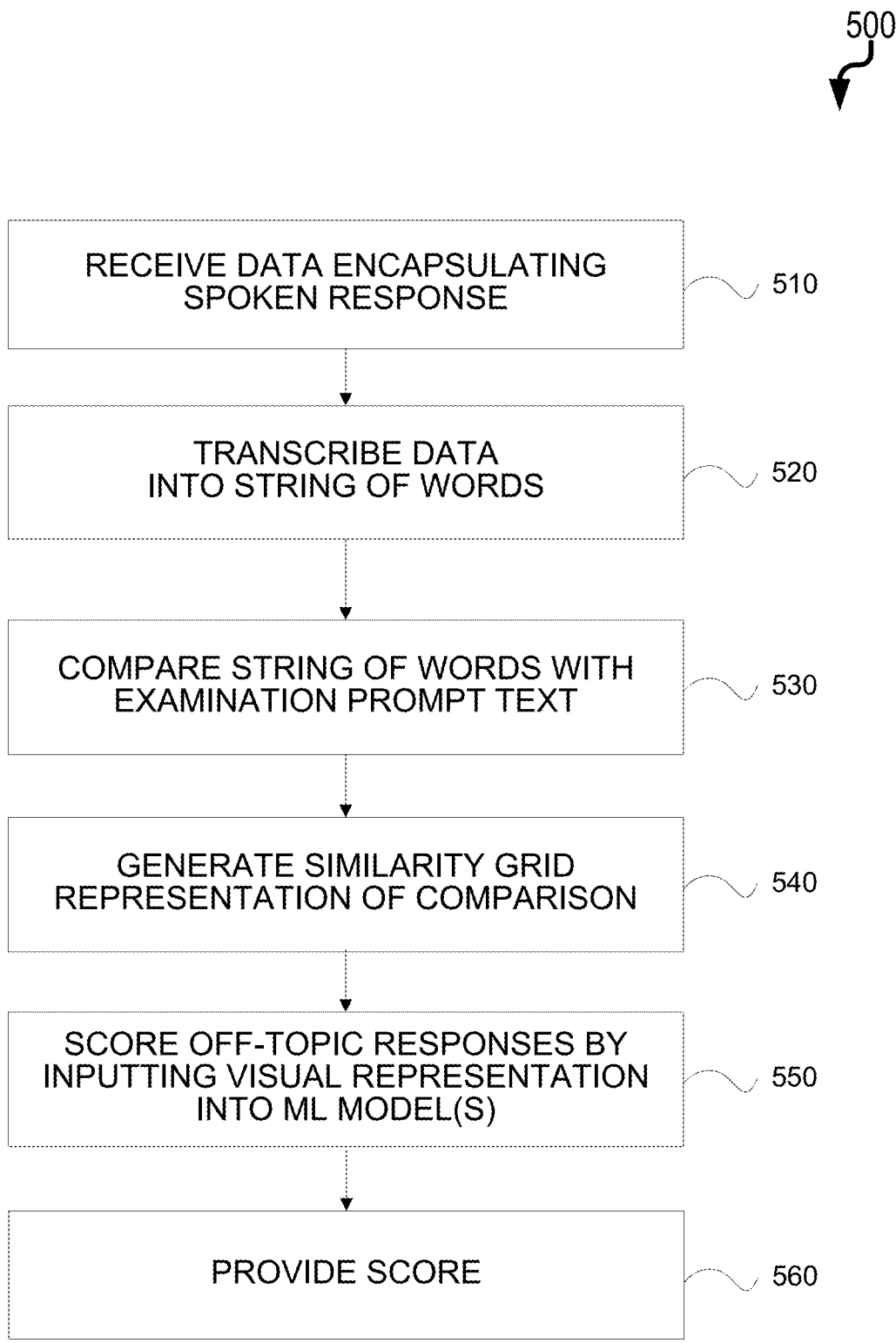
FIG. 5 is a process flow diagram illustrating the detection of off-topic spoken responses using machine learning.

FIG. 5 is a process flow diagram 500 in which, at 510, data is received that encapsulates a spoken response to a test question. Thereafter, at 520, the received data is parsed into a string of words. The string of words is then compared, at 530, with a prompt. Based on this comparison, at 540, a similarity grid representation is generated that visualizes a level of similarity between the string of words in the spoken response and the string of words in the prompt text. The similarity grid representation is then input, at 550, into at least one machine learning model to generate a score that indicates a likelihood of the spoken response having been off-topic. Data encapsulating the score can then, at 560, be provided (e.g., displayed, stored, loaded into memory, transmitted to a remote computer, etc.)

Figure 6:
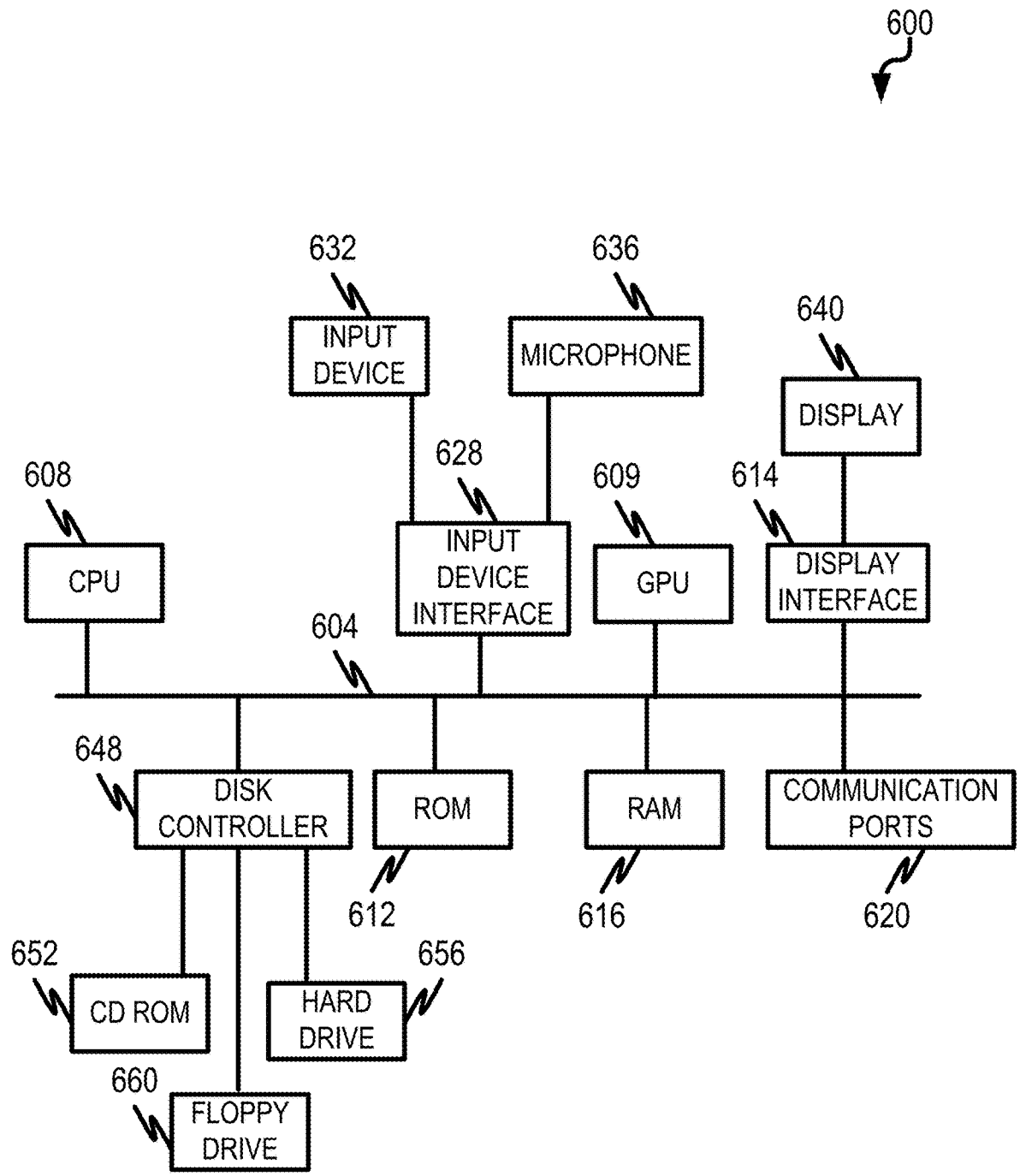
FIG. 6 is a diagram of a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers) and/or a processing system 609 GPU (graphics processing unit) can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data encapsulating a spoken response to a prompt text comprising a string of words;
transcribing the received data into a string of words;
comparing the string of words with the prompt;
generating a similarity grid representation of the comparison that characterizes a level of similarity between the string of words in the spoken response and the string of words in the prompt text, the similarity grid representation being a similarity grid having at least one channel in which each pixel indicates a similarity between pairs of words from the string of words in the spoken response and the string of words in the prompt text;
scoring the grid using at least one machine learning model, the score indicating a likelihood of the spoken response having been off-topic; and
providing data encapsulating the score.

2. The method of claim 1, wherein the providing comprises at least one of: displaying the score in an electronic visual display, loading data encapsulating the score in memory, storing the data encapsulating the score in physical persistence, or transmitting the data encapsulating the score to a remote computing device.

3. The method of claim 1, wherein the transcribing utilizes an automated speech recognition (ASR) engine.

4. The method of claim 1, wherein the at least one machine learning model comprises: a deep learning model.

5. The method of claim 4, wherein the deep learning model is a very deep convolutional neural network.

6. The method of claim 1, wherein the similarity grid comprises a single channel in which each pixel indicates a cosine similarity of word embeddings between pairs of words from the string of words in the spoken response and the string of words in the prompt text.

7. The method of claim 1, wherein the similarity grid comprises multiple channels in which the channels encode similarities from different aspects.

8. The method of claim 7, wherein a first channel indicates a cosine similarity of word embeddings between pairs of words from the string of words in the spoken response and the string of words in the prompt text.

9. The method of claim 8, wherein a second channel scales similarities with word importance values (idf) for the string of words in the spoken response.

10. The method of claim 9, wherein a third channel scales similarities with the idf values for the string of words in the prompt text.

11. The method of claim 1 further comprising:
conveying the prompt to a user in a graphical user interface of a computing device as text.

12. The method of claim 1 further comprising:
conveying text corresponding to the prompt to a user orally; and
capturing the spoken response to the prompt by way of a microphone coupled to a computing device.

13. A system comprising:
at least one data processor; and
memory storing instructions which, when executed by the at least one data processor result in operations comprising:
receiving data encapsulating a spoken response to a prompt text comprising a string of words;
transcribing the received data into a string of words;
comparing the string of words in the spoken response with the string of words in the prompt text;
generating a similarity grid representation of the comparison that characterizes a level of similarity between the string of words in the spoken response and the string of words in the prompt text, the similarity grid representation being a similarity grid having at least one channel in which each pixel indicates a similarity between pairs of words from the string of words in the spoken response and the string of words in the prompt text;

scoring the grid using at least one machine learning model, the score indicating a likelihood of the spoken response having been off-topic; and providing data encapsulating the score.

14. The system of claim 13, wherein the providing comprises at least one of: displaying the score in an electronic visual display, loading data encapsulating the score in memory, storing the data encapsulating the score in physical persistence, or transmitting the data encapsulating the score to a remote computing device.

15. The system of claim 14, wherein the at least one machine learning model comprises: a deep learning model.

16. The system of claim 15, wherein the deep learning model is a very deep convolutional neural network.

17. The system of claim 13, wherein the similarity grid comprises a single channel in which each pixel indicates a cosine similarity of word embeddings between pairs of words from the string of words in the spoken response and the string of words in the prompt text.

18. The system of claim 13, wherein the similarity grid comprises multiple channels in which the channels encode similarities from different aspects, a first channel indicating a cosine similarity of word embeddings between pairs of words from the string of words in the spoken response and the string of words in the prompt text, a second channel scaling similarities with word importance values (idf) for the string of words in the response, and a third channel scaling similarities with the idf values for the string of words in the prompt.

19. A computer-implemented method comprising:

receiving data encapsulating a spoken response to a prompt comprising a string of words;

transcribing the received data into a string of words;

comparing the content words in the spoken response with content words in the prompt text;

generating a similarity grid representation of the comparison that characterizes a level of similarity between the content words in the spoken response and the content words in the prompt text, the similarity grid representation being a similarity grid having a t least one channel in which each pixel indicates a similarity between pairs of words from the content words in the spoken response and the content words in the prompt text;

scoring the grid using at least one deep learning machine learning model, the score indicating a likelihood of the spoken response having been off-topic; and providing data encapsulating the score.

20. The method of claim 19, wherein the similarity grid comprises either (i) a single channel in which each pixel indicates a cosine similarity of word embeddings between pairs of words from the string of words in the spoken response and the string of words in the prompt text; or (ii) multiple channels in which the channels encode similarities from different aspects.

\* \* \* \* \*